United States Patent [19]
Parry

[11] 3,852,144
[45] Dec. 3, 1974

[54] ULTRASONIC SEAMING AND CUTTING APPARATUS

[75] Inventor: Frank Parry, Monroe, Conn.

[73] Assignee: Branson Instruments, Incorporated, Stamford, Conn.

[22] Filed: Mar. 16, 1973

[21] Appl. No.: 341,860

[52] U.S. Cl. ................ 156/510, 156/73, 156/580, 228/1, 83/701, 83/926 H
[51] Int. Cl. ........................ B06b 3/00, B23k 1/06
[58] Field of Search ............ 156/580, 73, 582, 489, 156/515, 510; 264/23; 228/1; 83/926 H, 582, 699, 171, 701

[56] References Cited
UNITED STATES PATENTS

| | | | |
|---|---|---|---|
| 3,272,682 | 9/1966 | Balamuth et al. | 156/580 |
| 3,623,388 | 11/1971 | Gottling et al. | 83/582 |
| 3,667,330 | 6/1972 | Kobernick | 83/926 H |
| 3,734,805 | 5/1973 | Obeda et al. | 156/580 |
| 3,737,361 | 6/1973 | Obeda | 156/580 |

Primary Examiner—Charles E. Van Horn
Assistant Examiner—M. G. Wityshyn
Attorney, Agent, or Firm—Ervin B. Steinberg

[57] ABSTRACT

An ultrasonic seaming and cutting apparatus comprises a resonant horn, a rotating anvil wheel and a cutting surface disposed in juxtaposition with the anvil wheel. The cutting surface preferably is formed by a peripheral portion of a disk which is stationary, but incrementally rotatable to present selectively a new and sharp cutting surface to the horn. The wheel and disk are mounted for independent and resilient movement toward the frontal surface of the horn to accommodate different workpiece thicknesses and to reduce the wear apparent on the cutting surface.

18 Claims, 8 Drawing Figures

PATENTED DEC 3 1974

ULTRASONIC SEAMING AND CUTTING APPARATUS

BACKGROUND OF THE INVENTION

This invention is related to copending application for U.S. Patent of F. Parry, Ser. No. 240,199 entitled "Ultrasonic Seaming Apparatus" filed on Mar. 31, 1972 now U.S. Pat. No. 3,764,442, issued Oct. 9, 1973 in which there is disclosed an ultrasonic seaming apparatus having a plurality of laterally spaced anvil disks driven in unison and used in combination with an opposing resonant ultrasonic horn surface for providing parallel seams in material of different thickness. In order to accomplish this task, each of the anvil disks is independently suspended with bias means urging the rotating peripheral surface of each respective disk toward contact with the frontal surface of the horn.

The instant invention is related, moveover, to arrangements for cutting thermoplastic sheet material while providing simultaneously a sealed or fused edge to prevent fraying or unravelling of loose fibers at the edge. Apparatus for this purpose have been described in U.S. Pat. No. 3,378,429 dated Apr. 16, 1968 issued to E. G. Obeda entitled "Method and Apparatus for Treating Material with Sonic Energy" and U.S. Pat. No. 3,679,526 dated July 25, 1972 issued to R. C. Horton entitled "Sonic or Ultrasonic Cutting Apparatus." However, ultrasonic cutting apparatus of this type have not been entirely successful on account of the excessive wear manifest at the anvil or horn surface. As is well understood, the repetitive high frequency impact of the horn with a force of several thousand $g$ ($g$ = 981cm/sec$^2$) causes excessive wear and deterioration of the cutting edge which may be disposed either on the anvil or the frontal surface of the horn.

More recently the need has arisen for a seaming machine which ultrasonically fuses or bonds two or more layers of thermoplastic material together in a manner similar to a sewing machine and includes means for cutting and fusing the material in a marginal portion adjacent the seam.

The present apparatus discloses a seaming and cutting apparatus of this type in which ultrasonic means are provided to effect a longitudinal seam and additional means are provided to simultaneously cut and fuse the material adjacent the seamed area without that excessive wear is manifest at the instrumentality providing such cutting action. In this manner it is possible to fabricate completely finished articles, such as curtains or spreads, wherein the folded seam or hem usually deemed necessary to provide an acceptable finished appearance can be omitted. Moreover, the cutting instrumentality operable in conjunction with the seaming apparatus is constructed so as to eliminate excessive wear by being resiliently mounted relative to the frontal surface of the horn which provides the mechanical energy for cutting. A further salient feature of the invention concerns an arrangement for adjusting the cutting action with regard to pressure and bringing unused cutting edge portions into operative position.

Other and still further important features of the present invention will be more clearly apparent by reference to the following description when taken in conjunction with the accompanying drawing.

DETAILED DESCRIPTION OF THE INVENTION

Figure 8:
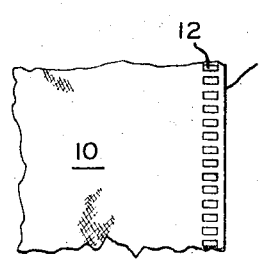
FIG. 8 is a plan view showing a portion of a workpiece produced by the apparatus illustrated heretofore.

Referring now to the figures and FIG. 8 in particular, numeral 10 identifies a piece of sheet material which has been seamed along the seam 12 and cut along the edge 14 during the seaming operation. When using ultrasonic energy, the seaming is essentially a bonding or fusing operation involving the localized frictional heating and fusing of thermoplastic material. Hence, the material 10 must be made entirely or partially of thermoplastics. Recently developed non-woven fiber material or woven material containing no less than 65 percent thermoplastic fibers is particularly suitable for ultrasonic seaming. The edge 14 is sealed during and simultaneously with the cutting process. The cutting implement is subjected to ultrasonic vibratory energy thereby effecting fusing of the cut edge as described in the patent to Obeda supra. Hence, unravelling, loose fibers or the appearance of a frayed edge is prevented. In this manner the article provides a "finished" appearance acceptable to the trade and its customers.

Figure 1:
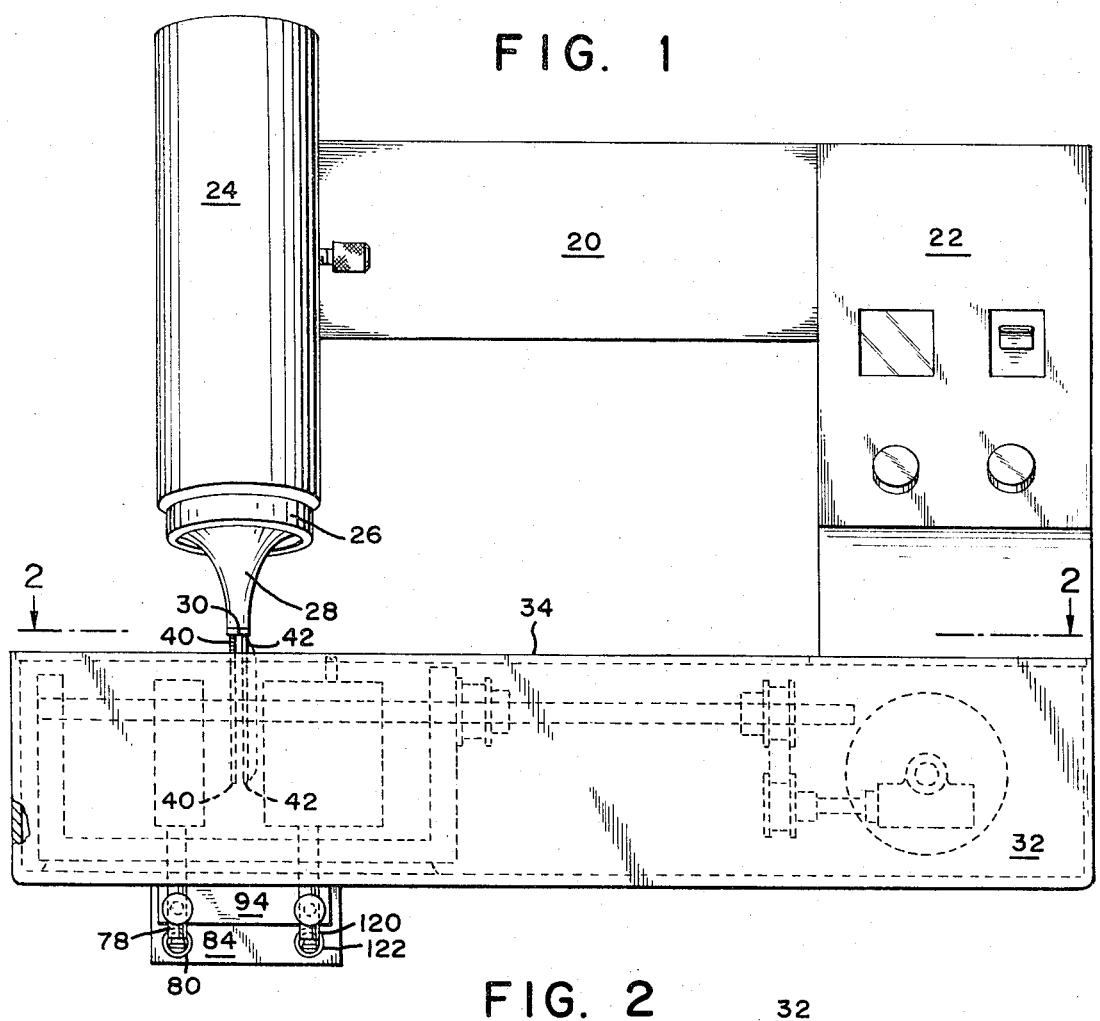
FIG. 1 is a front elevational view of the present apparatus according to the invention.

The apparatus for seaming and cutting is illustrated in FIGS. 1 through 7 and referring to FIG. 1 in particular, there is shown a support 20 having a control panel 22 and means (not shown) for supporting a cylindrical sleeve 24. For the sake of simplicity, only the most pertinent elements will be described hereafter since other features of the ultrasonic seaming apparatus are disclosed in allowed and still pending patent applications.

The sleeve 24 supports an electroacoustic converter 26 which is fitted with a horn 28, also known as resonator, tool, concentrator, mechanical amplitude transformer, etc., see Ultrasonic Engineering (book) by Julian R. Frederick, John Wiley & Sons, Inc., New York, N.Y. (1965) pages 87 to 103. The electroacoustic converter includes as a part of its construction transducing means of the piezoelectric or magnetostrictive kind for converting applied electrical high frequency energy to mechanical vibration. Such vibration is received by the horn 28 which transmits the sonic energy to a workpiece fed in front and in contact with the frontal surface 30 of the horn. The electroacoustic converter and horn are dimensioned and constructed to be resonant at a predetermined frequency, for instance at 25 kHz. However, other frequencies, typically within the range from 1 to 100 kHz, may be considered usable depending, to some extent, on the particular operation and workpiece. An electroacoustic converter suitable for the instant purpose is described in U.S. Pat. No. 3,328,610 issued to S. E. Jacke et al., dated June 27, 1967 entitled "Sonic Wave Generator."

The support 20 rests on a base 32 which supports various other mechanisms which will be described with reference also to FIGS. 2 through 7. The base 32 supports a top plate 34, FIG. 4, which is provided with cutout 36 disposed opposite the frontal surface 30 of the horn 28. A rotatably mounted anvil wheel 40 and a cutting instrumentality 42, in the present example, a disk, are mounted in juxtaposition so that a peripheral portion of each is urged toward contact with the frontal surface 30 of the horn 28. It will be apparent that the frontal surface of the horn is sufficiently wide to cover the space occupied by the wheel and disk. During operation the horn vibrates toward impact with the peripheral surface of the wheel 40 and the cutting edge of the disk 42. As sheet material is fed through the nip between the frontal surface 30 of the horn 28 and the wheel 40 and disk 42, the wheel 40 and disk 42 constitute anvil means. The rim of the wheel 40 may be provided with an embossed ornamental pattern, for instance straight or inclined lines, chevrons, zig-zag lines or other ornamentation to provide a patterned seam as is known in the art.

The anvil wheel 40 serves as a feed wheel for feeding the sheet material to be seamed in front of the horn 28 to cause seaming by ultrasonic energy. The wheel is driven, see FIG. 2, by a variable speed motor 44 via gear reducer 46, shaft 48, pulley 50 affixed to shaft 48, flexible belt 52, pulley 54, shaft 56, pulley 58, belt 60, pulley 62, shaft 64, pulley 66, belt 68 and pulley 70 affixed to stub shaft 72 to which the wheel 40 is secured. The motor 44 is driven at a variable speed by regulating means, such as a spring-loaded foot control, under the control of an operator performing the seaming operation as will be readily apparent.

Figure 2:
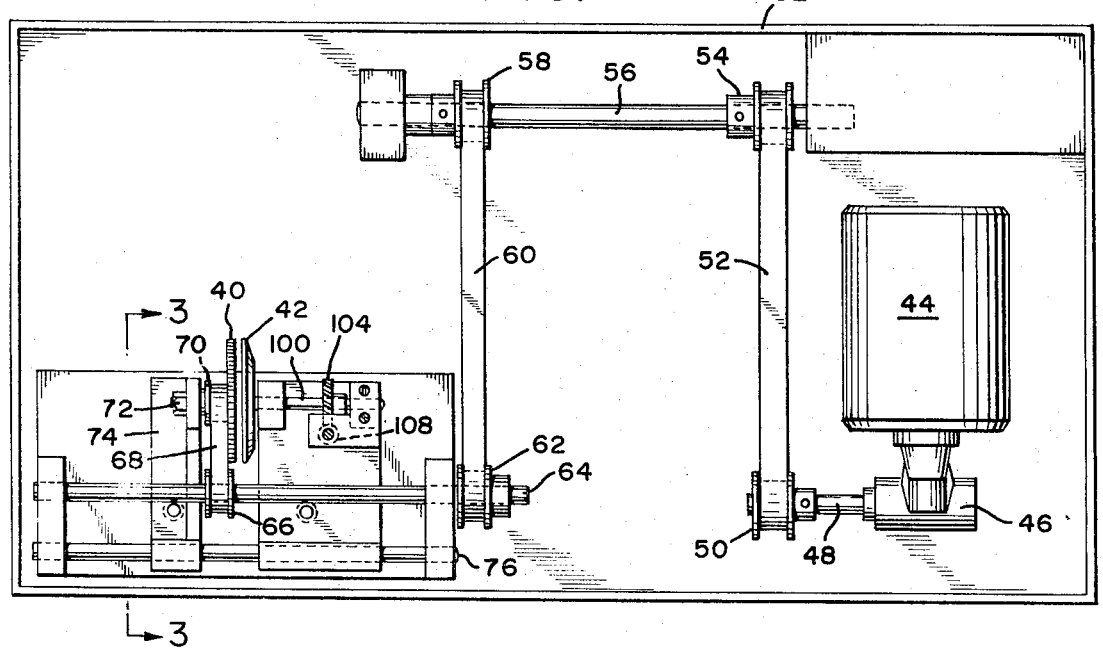
FIG. 2 is a plan view along line 2—2 in FIG. 1.
Figure 3:
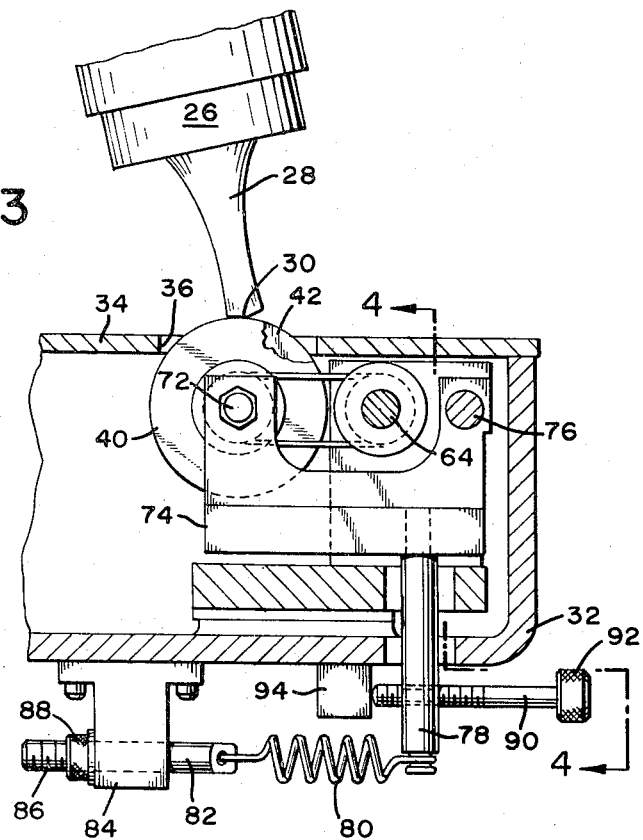
FIG. 3 is a cross-sectional view along line 3—3 in FIG. 2.
Figure 4:
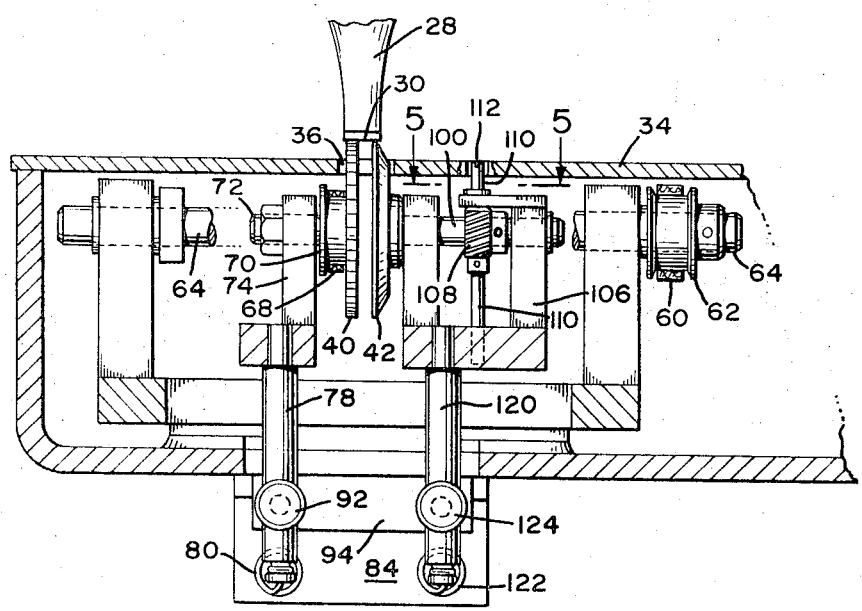
FIG. 4 is a sectional view along line 4—4 in FIG. 3.

The stub shaft 72 is mounted in a U-shaped bearing block 74 which is mounted for pivotal motion about a stationary shaft 76, see FIGS. 2 and 3. The bearing block 74 is fitted with a stud 78 the other end of which is engaged by one end of a helical tension spring 80. The opposite end of the spring 80 is anchored in a stud 82 fitted for sliding motion through a hole in a stationary block 84 which is screw fastened to the underside of the base 32. The stud 82 is threaded at 86 and provided with a nut 88 so as to adjust the tension of the spring 80 and thereby to adjust the spring bias with which the rim or peripheral surface of the anvil wheel 40 is urged toward engagement with the frontal surface 30 of the horn 28. Stop means comprising a threaded stud 90 having a knurled head 92 and fitting through a threaded hole in the stud 78 in combination with a fixed stop 94 limit the motion of the wheel 40 toward the horn surface 30. This feature provides for the setting of a minimum gap between the horn and the anvil wheel through which the workpiece is fed. The gap setting prevents overwelding, cutting or thinning the workpiece beyond acceptable limits.

Figure 5:
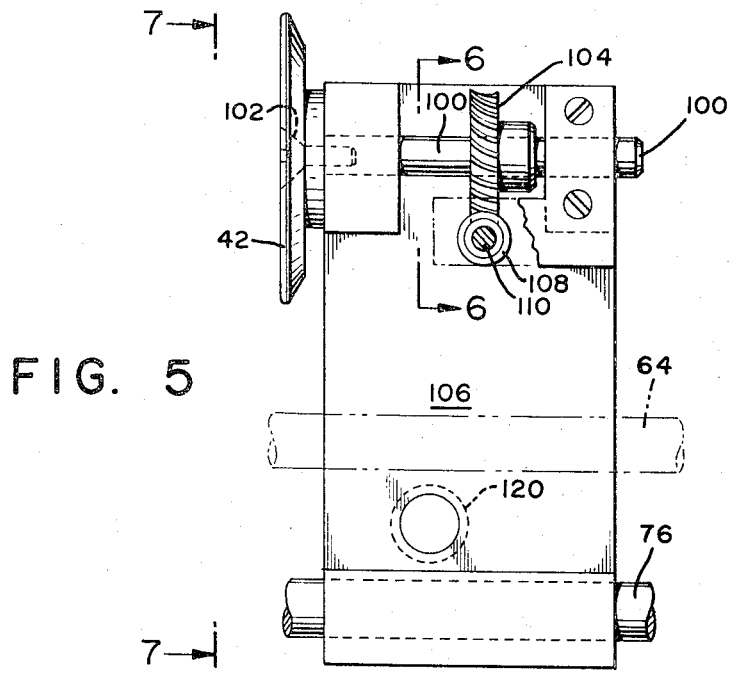
FIG. 5 is a sectional view along line 5—5 in FIG. 4.
Figure 6:
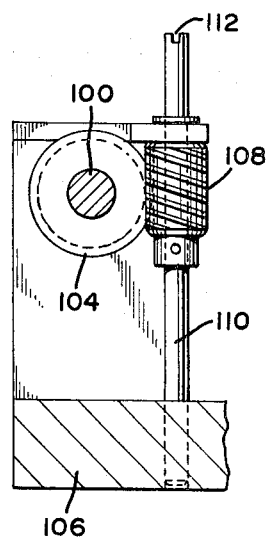
FIG. 6 is a sectional view along line 6—6 in FIG. 5.
Figure 7:
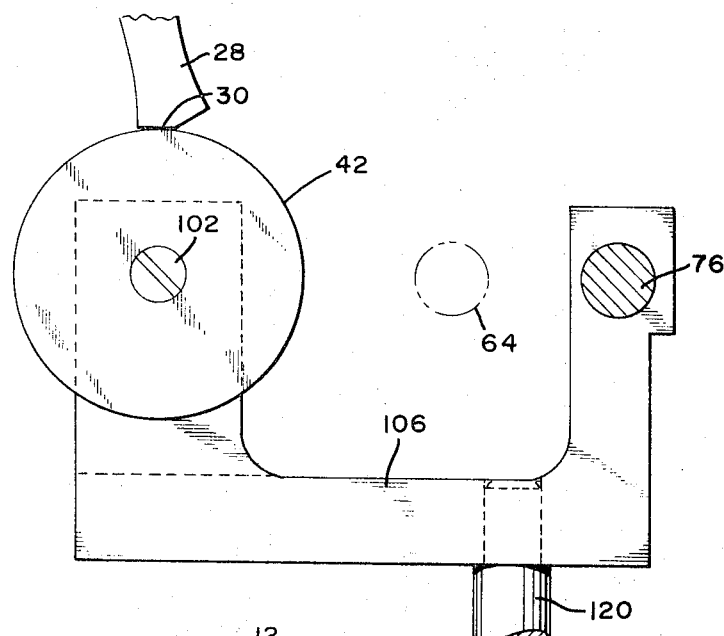
FIG. 7 is an end view along line 7—7 in FIG. 5.

Describing now the cutting instrumentality, the disk 42, having substantially the same diameter as the wheel 40, is provided with a peripheral cutting edge, see also FIGS. 5 to 7. The disk 42 is removably affixed to a stub shaft 100 by a screw 102. The stub shaft 100 is fitted also with a worm gear 104 and is supported in a U-shaped bearing block 106. The block 106 is mounted for pivotal motion about the stationary shaft 76 previously described in conjunction with bearing block 74. The worm gear 104 meshes with a worm 108 affixed to a shaft 110 which has a screwdriver slot 112. Upon turning the shaft 110, consecutively new and sharp cutting portions of the periphery of the disk 42 can be located opposite the frontal surface 30 of the horn 28. Hence, the length of the available cutting surface is substantially 3.14 times the diameter of the disk. After the entire available surface has become dull, the disk 42 is replaced by loosening the screw 102 and mounting a replacement disk upon the shaft 100. Alternatively, the disk surface can be sharpened.

Investigation has shown that the wear of the cutting edge of the disk 42 can significantly be reduced by a resilient mount of the disk. As stated, the block 106 is supported for pivotal motion on shaft 76. A stud 120, FIG. 7, is fastened to the block 106 which, in turn, is engaged by the end of a spring 122 whose other end is anchored as described in connection with elements 82, 84, 86 and 88, see FIG. 3. The stud 120 is provided with a threaded stud 124 which rests against a stationary block (see elements 90 and 94 in FIG. 3) for limiting the motion of the cutting disk toward the frontal surface 30 of the horn 28.

It will be apparent that the seaming wheel 40 and the cutting instrumentality are independently suspended and independently biased toward engagement with the resonating horn for effecting seaming and cutting during a single passage of the workpiece underneath the horn, through the gap between the horn and the anvil wheel and cutting surface respectively. Moreover, the pivotal motion of the wheel 40 and that of the cutting disk 42 toward the horn are independently and selectively adjustable. The spring bias applied to the cutting edge measurably lengthens the life of both the cutting edge and that of the horn. The relative fast dulling of the edge and the grooving of the horn's frontal surface encountered with rigid mounting are greatly reduced. Under the high $g$ impact of the horn against the cutting surface, the latter is permitted to yield, yet still presenting a cutting surface. The resilient bias in combination with the gap setting means serves for compensating for wear occurring at the location of impact.

The lateral spacing between the wheel 40 and disk 42 is adjustable by sliding the bearing blocks 74 and 106 along the shaft 76 and securing them at the selected position by suitable collars, not shown.

Moreover it will be apparent to those skilled in the art that the present arrangement permits sewing and cutting of a workpiece which presents changing layers of thickness to the work station as the workpiece is fed past the horn. For instance, quilted material may vary in its thickness, yet the pivotal mounting of the blocks 74 and 106 efficiently and instantaneously accommodates variations of this nature. Hence, the apparatus described heretofore is eminently suited for use in a wide range of applications requiring seaming and cutting as may be the case when fabricating curtains, mattress pads, quilted covers and the like. Changing of the cutting surface is accomplished readily by inserting a screwdriver in the slot 112 and a slight turn.

Optimum pressure spring bias and gap settings are readily established after running a few test samples through the machine. In this respect the present apparatus does not vary materially from finding best stitch and pressure settings on conventional sewing machines.

What is claimed is:

1. An ultrasonic seaming and cutting apparatus comprising:

a horn adapted to be resonant at a predetermined frequency of sound having a frontal surface for imparting ultrasonic energy to a workpiece fed in front and in contact with said surface;

electroacoustic converter means coupled to said horn for causing said horn to be resonant;

a rotatably mounted anvil wheel disposed opposite said frontal surface for engaging the underside of a workpiece and responsive to being rotated feeding the workpiece by contact with the peripheral surface of said wheel past said frontal surface;

an instrumentality having a cutting edge mounted in juxtaposition with said anvil wheel and opposite said frontal surface in a manner to cause the cutting edge to be disposed for engaging the underside of the workpiece as the workpiece is fed past said frontal surface, and means coupled to said anvil wheel and said instrumentality for independently urging the peripheral portion of said wheel disposed opposite said frontal surface and said cutting edge toward engagement with the frontal surface of said horn for effecting seaming and cutting of the workpiece.

2. An ultrasonic seaming and cutting apparatus as set forth in claim 1, said means for independently urging said peripheral portion and said cutting edge toward engagement with said frontal surface comprising spring means.

3. An ultrasonic seaming and cutting apparatus as set forth in claim 1, said instrumentality having a cutting edge comprising a disk whose periphery is shaped to form a cutting edge.

4. An ultrasonic seaming and cutting apparatus as set forth in claim 3, said disk being stationary and means coupled to said disk for incrementally rotating the disk to dispose a changed peripheral portion opposite said frontal surface.

5. An ultrasonic seaming and cutting apparatus as set forth in claim 4, said disk being removably mounted to a shaft.

6. An ultrasonic seaming and cutting apparatus as set forth in claim 5, said shaft being supported in a block which is mounted for pivotal motion.

7. An ultrasonic seaming and cutting apparatus as set forth in claim 1, said means coupled to said wheel and said instrumentality including additional means for independently adjusting the bias with which said wheel and instrumentality are urged toward engagement with said frontal surface.

8. An ultrasonic seaming and cutting apparatus as set forth in claim 7, said additional means including independently operable means to limit the motion of said wheel and that of said instrumentality toward said frontal surface.

9. An ultrasonic seaming and cutting apparatus as set forth in claim 1, said instrumentality having a cutting edge comprising a disk whose periphery is shaped to form a cutting edge, and said disk being of substantially the same diameter as said wheel.

10. An ultrasonic seaming and cutting apparatus as set forth in claim 9, said wheel and said disk being mounted upon respective shafts which are supported by respective bearing blocks, and said bearing blocks being mounted for pivotal motion to a further shaft.

11. An ultrasonic seaming and cutting apparatus as set forth in claim 10, said shaft mounting said wheel being coupled to drive means for rotating said wheel for causing said wheel to feed a workpiece past said horn.

12. An ultrasonic seaming and cutting apparatus as set forth in claim 11, the shaft upon which said disk is mounted being coupled to gear means for incrementally rotating said disk whereby to expose different portions of its periphery to said frontal surface.

13. An ultrasonic seaming and cutting apparatus as set forth in claim 12, said gear means comprising a worm and worm gear.

14. An ultrasonic cutting apparatus comprising:

a horn adapted to be resonant at a predetermined frequency of sound having a frontal surface for imparting ultrasonic energy to a workpiece fed in front of and in contact with said surface;

electroacoustic converter means coupled to said horn for causing said horn to be resonant;

a stationary disk having a peripheral surface shaped as a cutting edge mounted opposite said frontal surface in a manner to cause a portion of said peripheral surface to be disposed for engaging the underside of the workpiece as the workpiece is fed past said frontal surface;

first means coupled to said disk for urging said portion of said peripheral surface toward engagement with the frontal surface of said horn for effecting cutting of the workpiece, and second means coupled to said disk for incrementally and selectively rotating said disk to dispose a changed peripheral surface portion opposite said frontal surface.

15. An ultrasonic cutting apparatus as set forth in claim 14, said disk being removably mounted to a shaft.

16. An ultrasonic cutting apparatus as set forth in claim 15, said shaft being supported in a block which is mounted for pivotal motion.

17. An ultrasonic cutting apparatus as set forth in claim 15, said first means coupled to said disk including additional means for adjusting the bias with which said peripheral surface is urged toward engagement with said frontal surface.

18. An ultrasonic cutting apparatus as set forth in claim 17, said additional means including means to limit the motion of said peripheral surface toward said frontal surface.

* * * * *